United States Patent Office 3,766,061
Patented Oct. 16, 1973

3,766,061
DECORATIVE IRIDESCENT COMPOSITIONS
Walter Mahler and Manuel Panar, Wilmington, Del., assignors to E. I. du Pont de Nemours and Company, Wilmington, Del.
No Drawing. Continuation-in-part of abandoned application Ser. No. 34,920, Apr. 13, 1970. This application Sept. 20, 1971, Ser. No. 182,194
Int. Cl. A61k 7/02; B44d 5/06; C09k 1/02
U.S. Cl. 252—1     32 Claims

ABSTRACT OF THE DISCLOSURE

Solid compositions having cholesteric properties, particularly iridescence are made by intimately mixing esters of cholesterol or cholesterol-like sterols, by melt or solution methods. The esters include a substantial proportion of hydrogen phthalate esters. The remaining esters preferably contain a carbocyclic ring. Sterols or sterol $3\beta$-halides can also be present in the mixture. If cinnamate esters are employed all or part of the hydrogen phthalate esters can be replaced with hydrogen isophthalate esters. The compositions are useful for decorative coatings.

RELATED APPLICATIONS

This application is a continuation-in-part of application Ser. No. 34,920, filed Apr. 13, 1970, and now abandoned.

BACKGROUND OF THE INVENTION

Field of the invention

This invention relates to novel solid compositions which have cholesteric properties.

In 1889 Reinitzer discovered a new state of matter which has come to be called the cholesteric mesophase, since it has most frequently been observed with derivatives of cholesterol or cholesterol-like sterols. The cholesteric mesophase (or cholesteric liquid crystal phase) is formed on melting suitable materials and exists over a limited temperature range. As with other forms of liquid crystals such as the smectic and nematic mesophases it exhibits in part the characteristics of a liquid and in part a degree of order similar to a solid. The cholesteric mesophase is characterized by striking optical properties, in particular uniaxial and optically negative character (in contrast with other forms of liquid crystals which are optically positive); the ability to scatter light, which when the incident light covers the visible range results in striking iridescent colors (i.e., which change with the angle of viewing), and by circular dichroism. The structure associated with the cholesteric mesophase is not fully understood but is believed to involve a helical molecular orientation, the pitch of the helix being of the order of the wavelength of visible light.

A recent discussion of the cholesteric structure is given by Feragason: Molecular Crystals, 1966, vol. 1, pp. 293–307, Gorden and Breach, Great Britain.

In the context of the present specification and claims, the expression "cholesteric properties" is employed to mean the characteristic optical properties usually associated with the cholesteric mesophase. It should be noted that although the term "cholesteric" suggests that either cholesterol or a cholesterol derivative is present in a composition, this in fact is not an absolute requirement, and "cholesteric" has only a historic connotation.

A discussion of liquid cholesteric compositions is given in U.S. Pat. 3,114,836 disclosing liquid mixtures of cholesteric compounds which change color reversibly with temperatures. Further examples of fluid cholesteric materials having a high sensitivity to temperature are disclosed in U.S. Pat. 3,441,513.

A solid cholesteric composition has been reported by I. G. Chistyakov and E. A. Kosterin, Rost. Kristallov. Akad. Nauk, S.S.S.R. Inst. Kristallog. 4, 68–73 (1964). Cholesteryl cinnamate mixed with a small amount of colophony was found to form a solid vitreous film exhibiting the rainbow colors of the cholesteric structure.

SUMMARY OF THE INVENTION

This invention comprises compositions particularly adapted for decorative uses which consist essentially of a mixture of ester derivatives of cholesterol or cholesterol-like sterols, and optionally cholesterol or cholesterol-like sterols in which any one component is present in an amount less than 95% by weight of the mixture, the mixture consisting, by weight, of:

At least 30% of esters of cholesterol or cholesterol-like sterols wherein the acid-derived moiety of the esters contain a cyclic group of 5–6 atoms and has a total of up to 18 carbons, and is free of aliphatic chains of more than 4 carbon atoms, the esters including at least 10% of at least one half-ester of phthalic acid, or of phthalic acid substituted with up to 4 halogen atoms or a nitro group; and Up to 30% of aliphatic esters of cholesterol or cholesterol-like sterols, wherein the aliphatic group contains up to 18 carbon atoms; and Up to 50% cholesterol or a cholesterol-like sterol, or hydrogen halide esters thereof wherein the 3-hydroxy group is replaced with halogen;

With the proviso that when the cinnamate ester of cholesterol or cholesterol-like sterols is present in an amount of at least 10%, said ester of phthalic acid or phthalic acid substituted with up to 4 halogen atoms or a nitro group can be replaced by half-esters of isophthalic acid.

The ingredients of the mixture being proportioned so that the composition has cholesteric properties.

This invention also comprises methods of applying said composition to decorate articles and to articles so decorated.

DETAILED DESCRIPTION OF THE INVENTION

The novel compositions of the present invention exhibit the striking optical properties in thin films generally characteristic of the cholesteric mesophase. The compositions of the present invention are, however, solid and, in general, sufficiently tough and flexible for practical use as decorative coatings.

Decorative coatings can be formed by applying the mixture from the melt or from solution. If applied from solution, cholesteric properties are frequently obtained directly by evaporation of the solvent at close to ambient temperature. In other instances heat-treatment of the solution-deposited mixture may be employed to modify or develop the cholesteric properties.

The compositions of the present invention can be considered as partially ordered glasses in the same sense that the cholesteric mesophase can be considered as partially ordered liquid. In contrast to the liquid cholesteric mesophase which is in stable equilibrium over a limited temperature range above the crystalline melting point, the glassy cholesteric solids of the present invention are believed to be in a metastable state.

The compositions of the present invention, however, are generally stable at ambient temperatures for at least six months. When held at higher temperatures, stability is decreased. At 40° C. the compositions retain cholesteric properties for at least 24 hours although in some instances irreversible changes in color may take place.

The novel compositions of the present invention are mixtures principally containing esters of cholesterol or cholesterol-like sterols and in general containing a substantial proportion of a sterol half-ester of phthalic acid, or certain substituted phthalic acids, preferably cholesterol hydrogen phthalate. The optimum proportions to obtain desired color within the visible range of the spectrum and at the same time forming color stable films will vary depending on the nature and the number of the components (which can be from 2 to 6 or more). Accordingly, some experimentation is necessary to ascertain the proportions of ingredients. Thus, the following discussion is intended as a guide rather than as a definition of proportions applicable in all circumstances.

With respect to the hydrogen phthalate esters, these are generally employed in substantial amounts. While as little as 10% can be employed in some instances, usually the phthalate half esters will be present in amounts of from 30% to 90% of the mixture. Isophthalic acid esters do not appear to be equivalent to phthalic acid esters, although where cinnamates are present in substantial amounts (i.e., greater than 10%), the phthalic acid half esters can be replaced with isophthalic acid half esters in whole or in part.

The remaining esters in the composition are preferably esters containing a cyclic group of 5 or 6 atoms, and most preferably esters containing an aromatic ring. Examples include cyclohexane carboxylic acid esters, cyclopentane carboxylic acid esters, esters of furoic acid, pyridine-3-carboxylic acid, and the like. The aromatic esters which are preferred are benzoates, cinnamates and hydrocinnamates optionally substituted with halogen, nitro, lower alkyl or lower alkoxy groups, e.g., p-toluate esters, p-chlorobenzoate esters, o-chlorobenzoate ester, 2,4-dichlorobenzoate ester, p-methylcinnamate ester, p-chlorocinnamate ester, p-nitrobenzoate ester, anisoate ester and the like.

The composition can contain up to 30% of aliphatic esters such as formates, acetates, butyrates, or other alkanoates. Aliphatic esters tend to render the compositions relatively soft and less color-stable and accordingly are not generally desirable.

The sterols themselves can be present in amounts not exceeding about 50%. Small amounts, e.g., about 10%, appear to be beneficial in brightening the color of the composition without substantially changing it.

The hydrogen halide esters, i.e., sterol compounds in which the 3-hydroxy group is replaced with halogen, can also be employed to produce brightly colored compositions which are generally somewhat unstable to light.

With regard to the sterols, cholesterol and its esters are preferred by reason of low cost, at least as major ingredients in the compositions of the present invention. Cholesterol, however, can be replaced in whole or in part by one or more like sterols.

In cholesterol the four rings are fused so that the puckered rings of the molecule are disposed in an essentially flat array. Substituents on the rings lie generally in the plane of the structure or axial thereto. The hydroxy group in the 3β-position lies essentially in the plane.

It will be recognized that the cholesteric properties result from a preferred packing of the molecules and hence the geometry of the molecules rather than the particular nature of possible substituents is the dominant factor in whether or not the compound can assume the cholesteric structure.

It is well known that sterol derivatives similar in overall geometry to the cholesterol derivatives do in fact exhibit the cholesteric mesophase. A wide variety of sterols having a similar configuration can be used to replace all or part of the cholesterol derived moiety in the practice of this invention, as is shown in the examples given hereinafter.

Cholesterol has the formula:

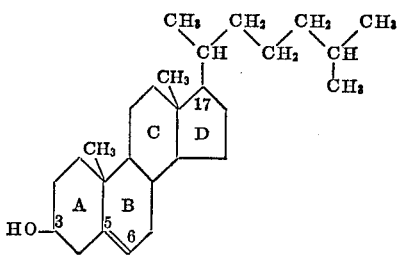

A wide variety of derivatives of cholesterol can be made by addition reactions involving the 5,6 double bond of the ring B, that is, compounds such as

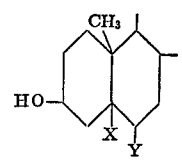

wherein X and Y are hydrogen (cholestanol), halogen, particularly fluorine, chlorine and bromine, hydroxy, nitro, lower alkyl and the like.

Compounds such as the 6-keto derivatives and such derivatives as the nitrimino derivatives made from said keto derivatives are likewise readily available. Dehydrocholesterol:

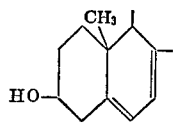

wherein an additional double bond is put in the B-ring is also readily obtained and has a generally similar configuration to cholesterol. All of the aforesaid sterols can be employed to replace cholesterol in the compositions of the present invention, alone or in mixture.

Variations in the side chains attached to $C_{17}$ occur in natural sterols such as β-sitosterol and ergosterol. Wide variations in the $C_{17}$ side chain can be tolerated. Thus pregnenolone, wherein the $C_{17}$ side chain of cholesterol is replaced by —$COCH_3$ can be used in the practice of this invention. Even wider variations in structure can be tolerated when a minor amount of the sterol or sterol derivative in question is employed in the composition. Thus up to 15% of the coprostanol derivative can be employed in the cholesteric composition of the present invention. Coprostanol is an isomer of cholestanol in which the A-ring is cis-fused to the B-ring and thus has a relatively non-planar structure. Likewise, diosgenin and its ester wherein the sidechain at $C_{17}$ is replaced with a spirocyclic structure can be employed in minor amounts, up to about 5% mixed with cholestanol esters for example, to form iridescent compositions.

A surface coated with a composition of this invention is iridescent; that is, the observed color of the surface depends upon the angle (θ) between the surface and the line of sight. (Throughout this application, descriptions of colors are those observed when the sample is illuminated with diffuse daylight or other comparable polychromatic light source.) The color observed when $\theta=90°$ will be called normal color. When the coloring material of the invention is applied in a uniform thickness and in such a manner that residual strains are minimized, the observed color is of longest wavelength when $\theta$ is 90°. Whenever $\theta$ is reduced, the color shifts toward shorter wavelengths.

In some instances, the light reflected normally lies partly or wholly in the infrared so that the normal color is seen as a dark red or is absent. As the angle of observation departs from the normal, the wavelength of the reflected light will shift towards the visible and red reflected light is observed. Some compositions will exhibit a normal reflection so far in the infrared that even a considerable departure from normal viewing will not detect color.

A phenomenon which is frequently seen with mixtures whose normal reflection is in the infrared is the appearance of color during cooling which shifts towards the red end of the spectrum and disappears as cooling progresses.

On the other hand materials may exhibit a violet normal color, while the reflected light at an angle to the normal is in the ultraviolet region of the spectrum. Some compositions exhibit normally reflected light in the ultraviolet. The phenomenon associated with reflection in the ultraviolet cannot usually be observed visually.

If such compositions have otherwise desirable mechanical properties the color can usually be corrected by the addition of minor amounts of certain components. Thus coprostanol esters, such as coprostanol benzoate, can be added in small amounts to increase the wavelength of the reflected light. On the other hand small amounts of diosgenin esters will usually decrease the wavelength of the reflected light.

This is not to imply that coprostanol and diosgenin esters are the only compounds which can be employed to modify the color. Indeed substantially all of the sterol compounds will possess this property to a greater or a lesser degree.

When the coloring material of the invention is applied in such a manner that considerable strains remain in the material and the thickness is uneven, e.g., by stroking the molten material with a spatula as it cools, the normal color may vary over the surface. One area may be red while an adjacent area is orange, yellow, or even greenish yellow. One area may be yellow while an adjacent area is green or even blue.

Furthermore, the colors resulting from changing $\theta$ may be even more complex. For example, consider a sheet of black-backed Mylar® polyester film colored by material of this invention in such a manner that strains and minor unevenness of thickness result. Consider this sheet to be marked with 4 points of the compass as though it were a map. When the surface is tilted, its orientation is designated by a letter and a number, e.g., 30–S, meaning that $\theta=30°$ and the edge marked south is nearest the eye of the observer. The colors of 4 points (A, B, C, D) of the surface are given in Table I.

TABLE I

| Orientation | A (W) | B (S) | C(E) | D |
| --- | --- | --- | --- | --- |
| Normal | R | R | Y-G | O. |
| 45-W | O | G | G | G. |
| 45-S | G | G | G | R. |
| 45-E | O (dull) | Y | G | G. |
| 45-N | R (bright) | G | G | G. |
| 20-W | Y (dull) | Y-G | Y-G | G. |
| 20-S | Black | G | G | Y (bright). |
| 20-E | do | Y-G | G | Y-G. |
| 20-N | O (bright) | Y-G | G | G. |

NOTE.—R=red; O=orange; Y=yellow; G=green.
Preparation of the above sample:
 65% cholesteryl H phthalate
 20% cholesteryl benzoate
 10% 5α-fluoro-6β-nitriminocholestan-3β-ol benzoate
 5% 5α-chloro-6β-nitrocholestan-3β-ol benzoate Components were dissolved in 5:2 methylene chloride/ toluene (ca. 7 ml./g.) and sprayed onto Mylar®. After drying, the film was heated to ca. 135° C. and perturbed with a spatula.

PREPARATION OF THE COMPOSITIONS

The usual method of making the compositions of the present invention involves intimately mixing the ingredients, and then heating to a temperature at which the mix is relatively fluid and at which the cholesteric structure is relatively stable, (hereinafter called the development temperature) for a period of time, which may be of the order of a few seconds to an hour or more depending on the viscosity at the development temperature.

The dry, finely powdered ingredients can be intimately mixed by tumbling in a suitable container and sold, shipped and stored in that condition: the heating step which produces the cholesteric properties being performed when the material is applied to the article.

Intimate mixing can also be accomplished by dissolving the components in a suitable solvent, and then evaporating the solvent. As noted above in some cases this process results in the deposition of the solids as a cholesteric composition directly. In other instances, heating at the development temperature is necessary to develop the iridescent coloring and other cholesteric properties. Suitable solvents include aromatic hydrocarbon, chlorinated hydrocarbon, esters or mixtures thereof. Typical solvents include benzene, toluene, xylene, chloroform, dichloroethane, trichloroethylene, ethyl acetate, ethyl propionate and combinations thereof. Preferably the selected solvent should boil at a relatively low temperature, and generally at less than 150° C. at atmospheric pressure in order to facilitate evaporation of the solvent.

The concentration of the ingredients in solution can vary within a wide range and will generally depend on such factors as the solubility of the components in the solvent, the viscosity of the final solution, and the desired thickness of the coating on the substrate. Usually, a concentration range of 10–60 weight percent is the most convenient for paint or spray applications, 20–40% representing the optimum. A high solid content solution, having up to about 75 weight percent can be prepared and used in warm solvents, 40–100°, or remain in supersaturated solution at 25° for useful periods of time (10 minutes—1 hour).

UTILITY

The compositions of this invention are particularly suitable for application as a decorative coating to articles such as paper cards, tile, leather, poromeric materials, wooden articles such as panels, furniture, plastics including thermoplastics and thermosetting resins, metals, glass and like solid objects. Particularly pleasing effects are obtained when the cholesteric glass compositions of the present invention are applied over a smooth light absorptive ground, preferably black, which can be, for example, a suitable coating of paint, pigmented plastic or the like. If desired, a transparent coating may be applied to enhance soil resistance, wear resistance or otherwise improve the properties of the coating.

For use as decorative coatings, the cholesteric solid compositions are preferably applied in a thickness of about $1\mu$ to $10\mu$. A thickness of up to about $200\mu$ is practical. Below the lower limit, the color intensity produced is insufficient for practical applications.

The color phenomenon in cholesteric materials is believed to require or be enhanced by shear forces in the material on solidification. This stress appears to be spontaneous in thin layers, generally not over $200\mu$ thick. Nevertheless, color can be obtained on thicker layers of the new compositions of the present invention, provided the surface is subjected to stress during the solidification. Coating techniques, such as pressing, printing, rolling or spreading with a doctor blade will provide sufficient shear to produce color on the surface.

The rate of cooling of the coating after heat treatment may also affect the color.

Patterned effects may be produced by various techniques such as patterning the light-absorptive background which is frequently employed to enhance the color. With some compositions reheating to a temperature below the development temperature may produce an irreversible change in the normal color of the heated material. By heating in a patterned manner multihue effects can be obtained with a single composition.

Among the many specific applications of the composition may be mentioned use as nail varnish or in the decoration of artificial fingernails which are intended to be applied over the natural fingernail with adhesives, coating for sunglasses, advertising displays, decorative wrappings in which a coating of a composition of the present invention is applied to a flexible substrate, toys, ceramic articles such as vases, tiles or the like, costume jewelry of metal or ceramic, furniture, wall coverings, lamps and lampshades or shoes, handbags, purses and like leather or poromeric materials and articles.

SPECIFIC EMBODIMENTS

This invention is further illustrated by the following examples which are not however, intended to fully delineate the scope of this discussion. In these embodiments, parts and percentages are by weight unless otherwise specified.

The normal color of the compositions was examined in most instances as a film spread on a black colored substrate. The following abbreviations are employed:

| Normal color: | Abbreviation |
|---|---|
| Infrared | IR |
| Maroon | M |
| Red | R |
| Bronze | Br |
| Orange | O |
| Yellow | Y |
| Green | G |
| Violet | V |

EXAMPLES 1–6

The compositions listed in Table II were prepared in the following manner: the ingredients were mixed together, then placed on a glass plate which was heated on a hot plate to a little above the melting point, about 175–200° C. The glass plate containing the melt was then removed from the heat, covered with another glass plate and allowed to cool. The colors formed by incident white light were viewed at a 90° angle to the plates.

TABLE II

| Composition | A | B | C | D | E | F |
|---|---|---|---|---|---|---|
| Example: | | | | | | |
| 1 — Cholesteryl hydrogen phthalate, percent | 60 | 40 | 40 | 80 | | |
| Cholesteryl hydrocinnamate, percent | 20 | 20 | 0 | 10 | | |
| Cholesteryl cinnamate, percent | 20 | 40 | 60 | 10 | | |
| Resulting color | G | R | Y | B | | |
| 2 — Cholesteryl hydrogen phthalate, percent | 10 | 30 | 50 | 50 | 80 | |
| Cholesteryl benzoate, percent | 65 | 35 | 25 | 50 | 20 | |
| Cholesterol, percent | 25 | 35 | 25 | 0 | 0 | |
| Resulting color | R | Y | YG | GB | B | |
| 3 — Cholesteryl hydrogen phthalate, percent | 30 | 40 | 45 | 60 | 80 | |
| Cholesteryl benzoate, percent | 35 | 40 | 10 | 20 | 10 | |
| Cholesteryl cinnamate, percent | 35 | 20 | 45 | 20 | 10 | |
| Resulting color | Y | YG | Y | BG | B | |
| 4 — Cholesteryl hydrogen phthalate, percent | 0 | 10 | 15 | 30 | 50 | |
| Cholesteryl hydrogen isophthalate, percent | 30 | 45 | 70 | 15 | 25 | |
| Cholesteryl cinnamate, percent | 70 | 45 | 15 | 55 | 25 | |
| Resulting color | YG | B | B | YG | BG | |
| 5 — Cholesteryl hydrogen phthalate, percent | 10 | 20 | 35 | 40 | 60 | 65 |
| Cholesteryl cinnamate, percent | 45 | 60 | 35 | 60 | 40 | 25 |
| Cholesterol, percent | 45 | 20 | 30 | 0 | 0 | 10 |
| Resulting color | Y | R | R | Y | BG | IR |
| 6 — Cholesteryl hydrogen phthalate, percent | 30 | 40 | 40 | 60 | 80 | |
| Cholesteryl cyclohexanecarboxylate, percent | 70 | 40 | 20 | 20 | 10 | |
| Cholesteryl cinnamate, percent | 0 | 20 | 40 | 20 | 10 | |
| Resulting color | R | G | G | G | B | |

EXAMPLES 7–21

In Examples 7–21, a mixture of 40 parts by weight of cholesteryl hydrogen phthalate, 40 parts of cholesteryl cinnamate and 20 parts of a benzoate ester of a similar sterol were dissolved in a solvent consisting of a mixture of 2 parts of toluene and 5 parts of methylene chloride to form a 25% solution. The solution was applied to black poly(ethylene terephthalate), evaporated and the film heated to 150° C. then cooled. The results are tabulated in Table III.

TABLE III

| Example | Similar sterol | Normal color | $\lambda_{max}$ |
|---|---|---|---|
| 7 | 7-dehydrocholesterol | B | 4,300 |
| 8 | Cholestanol | O-G | 6,300 |
| 9 | Stigmasterol | B-G | |
| 10 | Ergosterol | B-G | |
| 11 | 6-ketocholestanol | O-G | 5,900 |
| 12 | Cholestan-5α,6α-epoxy-3β-ol | | 5,500 |
| 13 | Lanosterol | V | |
| 14 | Pregnenolone | B | 4,200 |
| 15 | β-Sitosterol | B | 4,500 |
| 16 | Isoandrosterone | B | 4,300 |
| 17 | 5β-chloro-6β-nitrocholestan-3β-ol | O-G | 6,300 |
| 18 | 6,6-difluorocholesten-3β-ol | B-G | 5,100 |
| 19 | 5α-fluoro-6-ketocholestan-3β-ol | R | 7,500 |
| 20 | 6-nitrocholesterol | R | |
| 21 | 5α-fluoro-6-nitriminocholestan-3β-ol | R | |

EXAMPLES 22–25

The compositions listed in Table IV were prepared in the following manner: the ingredients were mixed in the indicated proportions and dissolved in toluene to give a 20% solution which was painted onto a black primer-coated steel plate. The toluene was allowed to evaporate on standing at room temperature and the color, formed as the mixture dried, was observed.

TABLE IV

| Composition | A | B | C | D | E |
|---|---|---|---|---|---|
| Example: | | | | | |
| 22. Cholesteryl hydrogen phthalate, percent | 40 | 60 | 70 | 70 | 90 |
| Cholesteryl hydrocinnamate, percent | 40 | 40 | 15 | 0 | 5 |
| Cholesteryl cinnamate, percent | 20 | 0 | 15 | 30 | 5 |
| Resulting color | R | G | B | B | G |
| 23. Cholesteryl hydrogen phthalate, percent | 25 | 40 | 55 | 70 | 80 |
| Cholesteryl benzoate, percent | 45 | 40 | 35 | 25 | 20 |
| Cholesterol, percent | 30 | 20 | 10 | 5 | 0 |
| Resulting color | R | G | B | B | B |
| 24. Cholesteryl hydrogen phthalate, percent | 60 | 70 | 80 | 90 | ----- |
| Cholesteryl cinnamate, percent | 20 | 30 | 0 | 5 | ----- |
| Cholesteryl benzoate, percent | 20 | 0 | 20 | 5 | ----- |
| Resulting color | B | B | B | B | ----- |
| 25. Cholesteryl hydrogen phthalate, percent | 20 | 40 | 60 | 65 | 90 |
| Cholesteryl cinnamate, percent | 60 | 50 | 40 | 25 | 10 |
| Cholesterol, percent | 20 | 10 | 0 | 10 | 0 |
| Resulting color | R | R | B | G | BG |

EXAMPLES 26–49

The examples given hereinbelow in Table V employed the technique disclosed for Examples 7 to 21.

TABLE V

| Composition | A | B | C | D | E | F |
|---|---|---|---|---|---|---|
| Example: | | | | | | |
| 26. Cholesteryl hydrogen phthalate, percent | 80 | 70 | 60 | 55 | 50 | ----- |
| Cholesteryl p-nitrobenzoate, percent | 20 | 30 | 40 | 45 | 50 | ----- |
| Development temperature | 150 | 150 | 150 | 150 | 150 | ----- |
| Normal color | V | B | G | R | M | ----- |
| 27. Cholesteryl hydrogen phthalate, percent | 40 | 36.4 | 70 | 50 | 35 | 40 |
| Cholesteryl cinnamate, percent | 40 | 36.4 | 15 | 30 | 35 | 30 |
| Cholesteryl-p-nitrobenzoate, percent | 20 | 27.2 | 15 | 20 | 30 | 30 |
| Development temperature | 165 | 165 | 100 | 165 | 165 | 165 |
| Normal color | Br | R | B | G | Br | Br |
| 28. Cholesteryl hydrogen phthalate, percent | 36.4 | 40 | 45.4 | 50 | 50 | 50 |
| Cholesteryl cinnamate, percent | 36.4 | 04 | 27.3 | 30 | 10 | 10 |
| Cholesteryl benaoate, percent | 9.1 | 10 | 18.2 | 10 | 20 | 25 |
| Cholesteryl p-nitrobenzoate, percent | 18.1 | 10 | 9.1 | 10 | 20 | 15 |
| Development temperature | 165 | 165 | 165 | 165 | 165 | 165 |
| Normal color | R | YO | G | G | B | G |
| 29. Cholesteryl hydrogen phthalate, percent | 50 | 50 | 50 | 50 | 50 | ----- |
| Cholesteryl benzoate, percentL | 35 | 25 | 22.5 | 20 | 17.5 | ----- |
| Cholesteryl bromide, percent | 15 | 25 | 27.5 | 30 | 23.5 | ----- |
| Development temperature | 125 | 120 | 125 | 115 | 110 | ----- |
| Normal color | B | G | Y | O | R | ----- |
| 30. Cholesteryl hydrogen phthalate, percent | 55 | 60 | 50 | 50 | 50 | 50 |
| Cholesteryl p-nitrobenzoate, percent | 35 | 20 | 40 | 25 | 20 | 30 |
| Cholesteryl bromide, percent | 10 | 20 | 10 | 25 | 30 | 20 |
| Development temperature | 165 | 140 | 165 | 150 | 157 | 140 |
| Normal color | Br | YO | R | R | R | R |
| 31. Cholesteryl hydrogen phthalate, percent | 50 | | | | | |
| Cholesteryl cinnamate, percent | 30 | | | | | |
| Cholesteryl p-nitrobenzoate, percent | 10 | | | | | |
| Cholesteryl bromide, percent | 10 | | | | | |
| Development temperature | 140 | | | | | |
| Normal color | BG | | | | | |
| 32. Cholesteryl hydrogen phthalate, percent | 35 | | | | | |
| Cholesteryl benzoate, percent | 30 | | | | | |
| Cholesteryl p-nitrobenzoate, percent | 5 | | | | | |
| Cholesterol, percent | 20 | | | | | |
| Cholesteryl bromide, percent | 10 | | | | | |
| Development temperature | 140 | | | | | |
| Normal color | O | | | | | |
| 33. Cholesteryl hydrogen phthalate, percent | 40 | 50 | 50 | 50 | 60 | 70 |
| Cholesteryl benzoate, percent | 40 | 40 | 30 | 25 | 15 | 15 |
| Cholesteryl chloride, percent | 20 | 10 | 20 | 25 | 25 | 15 |
| Development temperature | 115 | 115 | 115 | 115 | 110 | 135 |
| Normal color | GBr | B | G | R | R | O |
| 34. Cholesteryl hydrogen phthalate, percent | 50 | | | | | |
| Cholesteryl benzoate, percent | 20 | | | | | |
| Cholesteryl cinnamate, percent | 10 | | | | | |
| Cholesteryl chloride, percent | 20 | | | | | |
| Development temperature | 115 | | | | | |
| Normal color | G | | | | | |
| 35. Cholesteryl hydrogen phthalate, percent | 55 | 60 | 50 | 50 | 50 | ----- |
| Cholesteryl p-nitrobenzoate, percent | 35 | 20 | 20 | 40 | 1 | ----- |
| Cholesteryl chloride, percent | 10 | 20 | 20 | 10 | 10 | ----- |
| Cholesteryl cinnamate, percent | 0 | 0 | 10 | 0 | 30 | ----- |
| Development temperature | 165 | 120 | 140 | 170 | 140 | ----- |
| Normal color | BR | O | YO | M | G | ----- |
| 36. Cholesteryl hydrogen phthalate, percent | 50 | 50 | 50 | 50 | 50 | ----- |
| Cholesteryl benzoate, percent | 25 | 30 | 35 | 20 | 12.5 | ----- |
| Cholesteryl iodide, percent | 25 | 20 | 25 | 30 | 37.5 | ----- |
| Development temperature | 115 | 115 | 115 | 115 | 115 | ----- |
| Normal color | B | BG | B | G | O | ----- |
| 37. Cholesteryl hydrogen phthalate, percent | 80 | 70 | 62 | 60 | ----- | ----- |
| 6-ketocholestanol benzoate, percent | 20 | 30 | 38 | 40 | ----- | ----- |
| Development temperature | 190 | 170 | 170 | 160–170 | ----- | ----- |
| Normal color | B | G | OR | R | ----- | ----- |
| 38. Cholesteryl hydrogen phthalate, percent | 82.5 | 70 | 60 | 58 | ----- | ----- |
| Cholestanyl benzoate, percent | 17.5 | 30 | 40 | 42 | ----- | ----- |

TABLE V—Continued

| Composition | | A | B | C | D | E | F |
|---|---|---|---|---|---|---|---|
| Development temperature | | 140 | 145 | 145 | 150 | | |
| Normal color | | B | G | OR | R | | |
| 39 | Cholesteryl hydrogen phthalate, percent | 80 | 75 | 70 | | | |
| | Cholestanyl p-nitrobenzoate, percent | 20 | 25 | 30 | | | |
| Normal temperature | | 170 | 170 | 170 | | | |
| Normal color | | G | YO | R | | | |
| 40 | Cholesteryl hydrogen phthalate, percent | 75 | 70 | 70 | | | |
| | Cholestanyl p-nitrobenzoate, percent | 10 | 10 | 15 | | | |
| | 6-ketocholestanyl benzoate, percent | 15 | 20 | 15 | | | |
| Development temperature | | 165 | 165 | 165 | | | |
| Normal color | | Y | R | M | | | |
| 41 | Cholesteryl hydrogen phthalate, percent | 65 | 65 | | | | |
| | Cholestanyl benzoate, percent | 25 | 17.5 | | | | |
| | Cholesteryl p-nitrobenzoate, percent | 10 | 17.5 | | | | |
| Development temperature | | 155-160 | 90 | | | | |
| Normal color | | M | R | | | | |
| 42 | Cholesteryl hydrogen phthalate, percent | 50 | | | | | |
| | Stigmasterol benzoate, percent | 50 | | | | | |
| Development temperature | | 170 | | | | | |
| Normal color | | BG | | | | | |
| 43 | Cholesteryl hydrogen phthalate, percent | 70 | 75 | 70 | | | |
| | Cholesteryl benzoate, percent | 20 | 15 | 0 | | | |
| | Cholestery cinnamate, percent | 0 | 0 | 20 | | | |
| | 5a-fluoro-6-nitriminocholestan-3a-ol benzoate | 10 | 10 | 10 | | | |
| Development temperature | | 150 | 150 | 150 | | | |
| Normal color | | G | GY | OR | | | |
| 44 | Cholesteryl hydrogen phthalate, percent | 70 | 70 | | | | |
| | Cholesteryl benzoate, percent | 0 | 15 | | | | |
| | Cholesteryl cinnamate, percent | 20 | 0 | | | | |
| | 5a-fluoro-6-ketocholestan-3a-ol benzoate, percent | 10 | 15 | | | | |
| Development temperature | | 150 | 150 | | | | |
| Normal color | | O | R | | | | |
| 45 | Cholesteryl hydrogen phthalate, percent | 47.5 | 35 | | | | |
| | Cholesteryl cinnamate, percent | 47.5 | 55 | | | | |
| | Diosgenin benzoate, percent | 5 | 10 | | | | |
| Development temperature | | 110 | 130 | | | | |
| Normal color | | B | V | | | | |
| 46 | Cholesteryl hydrogen phthalate, percent | 70 | | | | | |
| | Cholesteryl cinnamate, percent | 20 | | | | | |
| | Coprostanyl benzoate, percent | 10 | | | | | |
| Development temperature | | 110 | | | | | |
| Normal color | | R | | | | | |
| 47 | Cholesteryl hydrogen phthalate, percent | 60 | 70 | | | | |
| | Cholesteryl benzoate, percent | 35 | 20 | | | | |
| | Coprostanyl benzoate, percent | 5 | 10 | | | | |
| Development temperature | | 110 | 110 | | | | |
| Normal color | | BG | O | | | | |
| 48 | Cholesteryl hydrogen phthalate, percent | 35 | | | | | |
| | Cholesteryl cinnamate, percent | 55 | | | | | |
| | Lanosteryl benzoate, percent | 10 | | | | | |
| Development temperature | | 175 | | | | | |
| Normal color | | G | | | | | |
| 49 | Cholesteryl hydrogen phthalate, percent | 20 | 60 | | | | |
| | Cholesteryl 2,4-dichlorobenzoate, percent | 80 | 40 | | | | |
| Development temperature | | 140-150 | 135 | | | | |
| Normal color | | R | B | | | | |

EXAMPLE 50

Cholesteryl hydrogen phthalate and cholesteryl cinnamate, 1 part of each, were dissolved in 8 parts of benzene.

The resulting solution was spread on a black painted panel with 4-mil doctor blade. After evaporation of the solvent, a smooth green coating remained, which appeared blue at a 45° viewing angle.

EXAMPLE 51

A mixture containing 45 parts of cholesteryl hydrogen phthalate, 45 parts of cholesteryl cinnamate and 10 parts of cholesteryl benzoate was dissolved in 500 parts of toluene. The solution was sprayed onto a sheet of poly (ethylene terephthalate) 10" x 14" x 1.5 mil, which was covered with another sheet of the same size and the resulting sandwich pressed at 150° C. and 1000 lbs. for one minute. The sandwich had a bright metallic green appearance that changed to metallic blue when viewed at an angle. The same result was obtained by pressing at 10,000 lbs. for 10 minutes at 150° C. The color appeared enhanced to the eye when the back of one sheet was painted black.

A similar treatment of a composition containing 60 parts of cholesteryl hydrogen phthalate, 30 parts of cholesteryl cinnamate and 10 parts of cholesteryl benzoate produced a metallic blue sheet.

Similarly, a composition containing 40 parts of cholesteryl hydrogen phthalate, 40 parts of chloesteryl benzoate and 20 parts of cholesterol gave a copper-colored sheet.

EXAMPLE 52

A mixture of 45 parts of cholesteryl hydrogen phthalate, 45 parts of cholesteryl cinnamate and 10 parts of cholesteryl benzoate was spread as a powder on the surface of a 5-mil polyethylene film. This material was covered with a similar polyethylene film and pressed at 100° C. and 5000 lbs. pressure. The resulting composition was heated to 150° C. for 2 minutes without pressure and then pressed at 100 lbs. for 30 seconds, producing a sheet of polyethylene with the cholesteric green-blue colored phase embedded in it. This polyethylene sheet was used as a decorated wrapping material for candy and small gift items.

EXAMPLE 53

A mixture of 45 parts of cholesteryl hydrogen phthalate, 45 parts of cholesteryl cinnamate and 10 parts of cholesteryl benzoate was spread as a powder between two sheets of polyurethane and pressed at 150° C. for 30 seconds. The polyurethane was fused into a single sheet with green spherules embedded in it, which appeared blue when viewed at a 45° angle.

EXAMPLE 54

A mixture of 60 parts of cholesteryl hydrogen phthalate, and 40 parts of cholesteryl hydrocinnamate was dissolved in 500 parts of toluene. The solution was sprayed onto a black primer-coated steel plate, a sheet of poly(ethylene terephthalate) and a sheet of polypropylene. In each case a green coating was obtained. Viewed at a 45° angle, the color appeared blue.

EXAMPLE 55

A solution prepared by dissolving 85 parts of cholesteryl hydrogen phthalate, 7.5 parts of cholesteryl benzoate and 7.5 parts of cholesteryl cinnamate in 500 parts of toluene was painted on a black primer-coated steel plate. The cholesteric phase, left after drying, gave a blue color. The same solution was applied with a 6-mil doctor knife to a sheet of poly(methyl methacrylate). After drying, a blue coating was obtained.

EXAMPLE 56

A solution was prepared by dissolving 30 parts of cholesteryl hydrogen phthalate, 30 parts of cholesterol and 40 parts of cholesteryl benzoate in 500 parts of benzene. The solution was painted onto a black polypropylene sheet and onto a clear poly(methyl methacrylate) sheet. In both cases a red coating was obtained.

EXAMPLE 57

By means of the technique of Example 51, a solid cholesteric phase was prepared from 45 parts of cholesteryl hydrogen phthalate, 45 parts of cholesteryl cinnamate, and 10 parts of cholesteryl benzoate in 0.3-mil thickness as a layer between two 1.5 mil thick sheets of poly(ethylene terephthalate). This was cut out in the shape of a lady's fingernail and glued onto the fingernail. The metallic green color could be modified by painting the downside either black or red. The reflected color was itself attractive and the change of color with viewing angle afforded special interest.

EXAMPLE 58

A polyester sandwich containing a film of 45 parts of cholesteryl hydrogen phthalate, 45 parts of cholesteryl cinnamate and 10 parts of cholesteryl benzoate between two poly(ethylene terephthalate) sheets, prepared as in Example 51, was cut out to fit over the lenses of a pair of sunglasses. The transparency of the material did not interfere with vision. Viewed from the outside, the surface appeared metallic green.

EXAMPLE 59

A solution of 30 parts of cholesteryl hydrogen phthalate, 30 parts of cholesterol, and 40 parts of cholesteryl benzoate in 500 parts of benzene was painted on a lady's fingernail which previously had been painted with black ink. A red fingernail coating was obtained. Observed at an angle, the color was green.

EXAMPLE 60

A mixture of 150 g. of cholesteryl hydrogen phthalate and 100 g. of cholesteryl hydrocinnamate with 300 ml. of toluene was warmed on a hot plate with stirring, until nearly all the solid material dissolved. The solution was filtered, and it was used instead of ink in a Flexographic® printing press. Prints were made on a black, glossy paper. A cholesteric green color appeared as the solvent evaporated during the press run.

This printing process can be adapted to any substrate to which print can otherwise be applied in a conventional manner. Such substrates include, in addition to paper, other materials, such as leather and leather substitutes; plastic materials, such as polyethylene, poly(ethylene terephthalate), and nylon; regenerated cellulose and various cellulose esters; metals, such as zinc, aluminum, copper, and iron; and glass. For best results, the substrate should have a smooth and nonabsorbing surface.

EXAMPLE 61

A mixture of 40 parts of cholesteryl hydrogen phthalate and 60 parts of cholesteryl cinnamate was melted in a beaker, poured onto the smooth, primed surface of a wooden table, and spread evenly with a heated metal spatula. After cooling, the surface had the appearance of gold enamel when viewed from directly above the table top. At a 45° angle the color was green, and at a shallow glancing angle the color appeared blue.

In a similar fashion, ceramic tiles can be coated with each of the compositions of Example 1 to give green, red, yellow and blue coatings. The tiles can be used on walls or to decorate coffee tables; or, because of the unusual color effects, can be worn on a chain around the neck.

EXAMPLE 62

To a solution of 40 ml. of conc. sulfuric acid and 20 ml. of water at 40° C. was added 1.5 g. of sodium nitrite. After cooling to −5° C., a solution of 5.42 g. of cholesteryl-p-aminobenzoate hydrochloride in 30 ml. of pyridine was added dropwise. When 15 ml. of the pyridine solution had been added, the reaction mixture was diluted with 100 ml. of ice and water. After this addition was completed, the diazo solution was stirred at 10° C. for one hour and then treated with 1 g. of urea. The diazo solution was added to a solution of 2.2 g. of 2-hydroxy-3-naphthoic acid with good agitation. After stirring for one hour at room temperature, a red dye was collected on a filter and washed with water. The dye was dried at 70° C. in an oven. This crude dye was dissolved in 300 ml. of boiling trichloro-ethylene and filtered hot. The filtrate was diluted with 300 ml. of isopropanol and cooled in an ice bath. A bright red dye consisting of cholesteryl 4(2-hydroxy-3-carboxy-1-naphthyl azo)benzoate was collected on a filter, washed with isopropanol, and dried at 70° C. in an oven; weight 2.2 g.

A mixture of 500 mg. of cholesteryl hydrogen phthalate, 200 mg. of cholesteryl cinnamate, 200 mg. of cholesteryl chloride and 100 mg. of the red cholesteric dye described above were dissolved in 3 ml. of "Triclene." This solution was spread into a strip of Mylar® film coated on the back side with a water soluble black paint. The solution on the Mylar® film (unpainted side) was dried at 60° C. and then pressed with a hot spatula heated at 130° C.+15° C. An orange-red color on a green iridescent background was developed by this treatment. On changing the plane of iridescent light to the Mylar® film, changes occurred in the multihued, iridescent colors. This red cholesteric dye retained full color at 65° C. in an oven for 24 hours.

Cholesteryl p-aminobenzoate hydrochloride can be prepared by the method of R. L. Shriner, J. Biol. Chem. 801 (1928).

EXAMPLE 63

A diazonium solution from 5.42 g. of cholesteryl p-aminobenzoate hydrochloride was prepared as described in the above example. The diazonium solution was added to a solution of 2.0 g. of 1-phenyl-3-methyl-5-pyrazolone in 20 ml. of pyridine. The yellow color was formed. The addition of a solution of 80 g. of sodium acetate in 200 ml. of water gave a copious precipitation of bright yellow dye. The dye was collected on a filter and washed with water. The dye consisting of cholesteryl 4(1-phenyl-3-methyl-5-pyrazolone-4-azo) benzoate, was dried at 65° C. in an oven; weight 5.9 g.; M.P. 105–110° C. with decomposition.

A mixture of 60 parts of cholesteryl hydrogen phthalate, 40 parts of cholesteryl cinnamate and 0.5 part of this yellow cholesteryl benzoate was melted at 120–130° C. on a hot plate and quickly applied by means of a hot, flat spatula to a black "Bakelite" bottle cap. Brilliant yellow patterns were super-imposed on bright blue-green iridescent colors. The yellow colors were brilliant and striking on the blue-green background. The colors were not changed after heating at 45–50° C. in an oven for 24 hours.

EXAMPLES 64–67

In Examples 64–67 a blend of the dry finely ground powder of the ingredients was made in each case by tumbling the mixture in a jar for several hours. The blended powder was then sprinkled on a black-painted metal sheet, covered with a film of a polyimide film sold under the tradename Kapton® and pressed with an electric iron set to give a sole temperature in the range 125–150° C. to melt the mix and develop the cholesteric properties. The assembly was then cooled and the polyimide film removed. The composition and normal color of the resulting iridescent film are given in Table VI.

TABLE VI

| Example | 64 | 65 | 66 | 67 |
|---|---|---|---|---|
| Composition (percent): | | | | |
| Cholesteryl hydrogen phthalate | 60 | 55 | 60 | 60 |
| Cholesterol | 5 | 5 | 10 | 10 |
| Cholesteryl benzoate | 25 | 10 | 6 | 8 |
| Cholesteryl nitrobenzoate | 0 | 10 | 0 | 0 |
| 5α-chloro-6β-nitrocholestanyl benzoate | 10 | 10 | 0 | 0 |
| Dibromocholestanyl benzoate | 0 | 0 | 12 | 12 |
| Cholesteryl cinnamate | 0 | 10 | 12 | 10 |
| Normal color | G | YO | OG | BG |

EXAMPLE 68

(A) Cholesteryl hydrogen tetrachlorophthalate

A solution was prepared containing 38.7 gm. (0.01 mole) of cholesterol, and 28.6 gm. (0.01 mole) of tetrachlorophthalic anhydride in 60 ml. of pyridine mixed with 60 ml. of toluene and warmed to about 50° C. The solution was then heated at 115°–120° C. for 3 hours during which it became darker in color. The solution was then drowned in 600 ml. of methanol heated to near boiling and treated with 10 gm. of absorbent charcoal (Darco G60) and 10 gm. of filter aid. The hot solution was then filtered. The tan-colored filtrate was acidified with 6.0 ml. of concentrated hydrochloric acid while being stirred. Cholesteryl hydrogen tetrachlorophthalate was deposited as an oil which then crystallized. The product was digested hot for one-half hour, then cooled in an ice bath. The product was then filtered, washed with equal parts of acetone and methanol, then dried overnight at 70° C. The melting point was 200–201° C.

(B) Cholesteric glass

A mixture of equal parts of cholesteryl hydrogen tetrachlorophthalate and cholesteryl cinnamate was applied to a black coated film of poly(ethylene terephthalate). On heating to about 120° C. and cooling, a yellow-bronze iridescent coating was formed on the surface of the film.

EXAMPLE 69

To 38.7 g. (0.1 mole) of cholesterol, 66 ml. of pyridine and 100 ml. of toluene at 50° C. was added 19.3 g. of 3-nitrophthalic anhydride. The solution was heated at 115–120° C. for 3 hours and then drowned into 1 l. of methanol containing 66 ml. of concentrated hydrochloric acid. After cooling to 0° C., the product was collected on a filter and washed with methanol: weight 45.4 g.; M.P. 146–187° C. The product was a mixture of cholesteryl hydrogen nitrophthalates.

A solution of 0.5 g. of this mixture of nitrophthalates and 0.5 g. of cholesteryl cinnamate in 5 ml. of methylene chloride was spread on a Mylar® film. The film was heated at 120° C. and pressed with a spatula. An orange, red, bronze color developed, which was stable at room temperature.

Potential users are reminded that approval of the Food and Drug Administration is necessary for use of chemicals in food-wrapping materials or materials brought into intimate contact with the body.

Since obvious modifications and equivalents in the invention will be evident to those skilled in the chemical arts, we propose to be bound solely by the appended claims.

The embodiments of the invention in which an exclusive property or privilege is claimed are defined as follows:

1. A solid composition consisting essentially of an intimate glassy mixture of ester derivatives of cholesterol or cholesterol-like sterols, and optionally unesterified cholesterol or cholesterol-like sterols, in which any one component is present in an amount less than 95% by weight of said mixture, said mixture consisting, by weight, of:
   at least 30% of esters of cholesterol or cholesterol-like sterols wherein the acid-derived moiety of each ester contains a cyclic group of 5–6 atoms, has a total of up to 18 carbons, and is free of aliphatic chains of more than 4 carbon atoms, the esters including at least 10% of at least one half-ester of phthalic acid, or a phthalic acid substituted with up to 4 halogen atoms or a nitro group, and
   up to 30% of aliphatic esters of cholesterol or cholesterol-like sterols, wherein the aliphatic group contains up to 18 carbon atoms; and
   up to 50% cholesterol or cholesterol-like sterol, or hydrogen halide esters thereof wherein the 3-hydroxy group is replaced with halogen,
   with the proviso that when the cinnamate ester of cholesterol or chloesterol-like sterols is present in an amount of at least 10%, said half-ester of phthalic acid or of phthalic acid substituted with up to 4 halogen atoms or a nitro group can replaced by half-esters of isophthalic acid,
   the ingredients of the mixture being proportioned so that the composition has cholesteric properties.

2. Composition of claim 1 wherein said mixture comprises at least 30% by weight of cholesteryl hydrogen phthalate.

3. Composition of claim 1 wherein said cholesterol-like sterols are selected from the group consisting of 7-dehydrocholesterol, cholestanol, stigmasterol, ergosterol, 6-ketocholstanol, cholestan-5α,6α-epoxy-3β-ol, lanosterol, pregnenolone, β-sitosterol, isoandrosterone, 5α-chloro-6β-nitrocholestan-3β-ol, 6,6-difluorocholestan-3β-ol, 5α-fluoro-6-ketocholestan-3β-ol, 6-nitrocholesterol, 5α-fluoro-6-nitriminocholestan-3β-ol, coprostanol, diosgenin and dibromocholestanol.

4. Composition of claim 3 wherein said mixture comprises at least 30% by weight of cholesteryl hydrogen phthalate.

5. Composition of claim 4 wherein the said acid-derived moiety of said esters is in addition to hydrogen phthalate, selected from the group consisting of benzoate, p-chlorobenzoate, p-toluate, anisoate, p-nitrobenzoate, 2,4-dichlorobenzoate, cinnamate, p-methylcinnamate, hydrocinnamate, p-methylhydrocinnamate, cyclohexane and carboxylate, and hydrogen isophthalate.

6. Composition of claim 5 wherein said mixture consists of about 60% cholesteryl hydrogen phthalate, about 5% cholesterol, about 25% cholesteryl benzoate and about 10% of 5α-chloro-6β-nitrocholestanyl benzoate.

7. Composition of claim 5 wherein said mixture consists of about 55% cholesteryl hydrogen phthalate, about 5% cholesterol, about 10% of cholesteryl benzoate, about 10% of cholesteryl cinnamate, about 10% of cholesteryl nitrobenzoate, and about 10% of 5α-chloro-6β-nitrocholestanyl benzoate.

8. Composition of claim 5 wherein said mixture consists of about 60% cholesteryl hydrogen phthalate, about 10% of cholesterol, and 6% of cholesteryl benzoate, about 12% of dibromocholestanyl benzoate and about 12% of cholesteryl cinnamate.

9. Composition of claim 5 wherein said mixture consists of about 60% cholesteryl hydrogen phthalate, about 10% of cholesterol, about 8% of cholesteryl benzoate, about 12% of dibromocholestanyl benzoate and about 10% of cholesteryl cinnamate.

10. A solid composition consisting essentially of an intimate glassy mixture of ester derivatives of cholesterol and optimally unesterified cholesterol, in which any one component is present in an amount less than 95% by weight of said mixture, consisting, by weight, of
   esters of cholesterol wherein the acid-derived moiety of each ester contains a cyclic group of 5–6 atoms, has a total of up to 18 carbon atoms, is free of aliphatic side-chains of more than 4 carbon atoms, the esters including at least 10% of one half ester of phthalic acid or of phthalic acid substituted with up to 4 halogen atoms or a nitro group; and up to 50% of cholesterol or hydrogen halide esters thereof wherein the 3-hydroxy group is replaced with halogen, with the proviso that when the cinnamate ester of cholesterol is present in an amount of at least 10%, said half ester of phthalic acid or of phthalic acid substituted with up to 4 halogen atoms can be replaced by half esters of isophthalic acid, the ingredients of the mixture being proportioned so that the composition has cholesteric properties.

11. Composition of claim 10 wheerin said mixture consists of cholesteryl hydrogen phthalate, cholesteryl benzoate, and cholesteryl hydrocinnamate.

12. Composition of claim 10 wherein said mixture consists of cholesteryl halogen phthalate and cholesteryl benzoate.

13. Composition of claim 10 wherein said mixture consists of cholesteryl hydrogen phthalate and cholesteryl cinnamate.

14. Composition of claim 10 wherein said mixture consists of cholesteryl hydrogen phthalate, cholesteryl benzoate, and cholesteryl cinnamate.

15. Composition of claim 10 wherein said mixture consists of cholesteryl hydrogen phthalate, cholesteryl cinnamate and cholesteryl halogen isophthalate.

16. Composition of claim 10 wherein said composition consists of cholesteryl isophthalate and cholesteryl cinnamate.

17. A composition consisting essentially of a mixture of finely powdered esters of cholesterol and cholesterol-like sterols, and optionally of the unesterified cholesterol or cholesterol-like sterols in which any one component is present in an amount less than 95% by weight of said mixture, said mixture consisting of:

at least 30% of esters of cholesterol or cholesterol-like sterols wherein the acid-derived moiety of each ester contains a cyclic group of 5–6 atoms, has a total of up to 18 carbons, and is free of aliphatic chains of more than 4 carbon atoms, the esters including at least 10% of at least one half-ester of phthalic acid, or of phthalic acid substituted with up to 4 halogen atoms or a nitro group, and up to 20% by weight of aliphatic esters of cholesterol or cholesterol-like sterols, wherein the aliphatic group contains up to 18 carbon atoms; and up to 50% cholesterol or a cholesterol-like sterol, or hydrogen halide esters thereof wherein the 3-hydroxy group is replaced with halogen, with the proviso that when the cinnamate ester of cholesterol or cholesterol-like sterols is present in an amount of at least 10%, said half-ester of phthalic acid or of phthalic acid substituted with up to 4 halogen atoms or a nitro group can be replaced by half-esters of isophthalic acid, characterized by forming a glassy composition having cholesteric properties on heating to a development temperature in the vicinity of the melting point and cooling to ambient temperature.

18. Composition of claim 17 wherein said mixture consists of:

about 60% cholesteryl hydrogen phthalate, about 5% cholesterol, about 25% cholesteryl benzoate and about 10% of 5α-chloro-6β-nitrocholestanyl benzoate.

19. Composition of claim 17 wherein said mixture consists of:

about 55% cholesteryl hydrogen phthalate, about 5% cholesterol, about 10% of cholesteryl benzoate, about 10% of cholesteryl cinnamate, about 10% of cholesteryl nitrobenzoate, and about 10% of 5α-chloro-6β-nitrocholestanyl benzoate.

20. Composition of claim 17 wherein said mixture consists of:

about 60% cholesteryl hydrogen phthalate, about 10% of cholesterol, about 6% of cholesterol benzoate, about 12% of dibromocholestanyl benzoate and about 12% of cholesteryl cinnamate.

21. Composition of claim 17 wherein the mixture consists of:

about 60% cholesteryl hydrogen phthalate, about 10% of cholesterol, about 8% of cholesteryl benzoate, about 12% of dibromocholestanyl benzoate and about 10% of cholesteryl cinnamate.

22. An article coated to a thickness of at least 1μ with the composition of claim 1.

23. Article of claim 22 wherein said coating has a thickness between 1μ and 200μ.

24. An article of furniture decorated with a coating having a thickness of at least 1μ of the composition of claim 1.

25. An artificial fingernail consisting essentially of a flexible substrate adapted to be attached adhesively to a human fingernail and a decorative coating of the composition of claim 1 having a thickness of at least 1μ.

26. An article comprising a substrate having a light-absorbing surface and a coating of the composition of claim 1 having a thickness of at least 1μ.

27. An article of claim 26 wherein said light-absorbing surface is black.

28. Article of claim 26 wherein said coating has a thickness of from 1μ to 200μ.

29. Article of claim 28 additionally comprising a transparent coating.

30. Article of claim 29 wherein said substrate and said coating are flexible films, and said article is suitable for wrapping.

31. A process for coating a substrate with a composition of claim 1, said process comprising depositing the components of the composition of claim 1 on the substrate to a thickness of at least 1μ, heating to a development temperature in the vicinity of the melting point, and cooling the coating to at least 50° C.

32. Process of claim 31 wherein mechanical shear is applied to said coating during the heating step.

References Cited

UNITED STATES PATENTS

| | | | |
|---|---|---|---|
| 3,409,404 | 11/1968 | Fergason | 252—408 X |
| 3,578,844 | 5/1971 | Churchill et al. | 350—160 R |
| 3,620,889 | 11/1971 | Baltzer | 23—230 LCX |
| 3,441,513 | 4/1969 | Woodmansee | 252—408 |
| 3,585,381 | 6/1971 | Hodson et al. | 250—83 R |
| 3,594,126 | 7/1971 | Fergason et al. | 23—230 LC |

ROLAND E. MARTIN, JR., Primary Examiner

U.S. Cl. X.R.

117—64 R, 65.2, 123 C, 127, 134, 138.8 B, 138.8 F, 138.8 R, 138.8 E, 138.8 NA, 138.8 N, 142, 144, 144.5, 147, 154, 159; 161—3.5, 6, 32, 33, 34, 190, 231, 410; 474—61; 351—44; 252—300, 40; 350—160 R, 160 P, 160 LC

UNITED STATES PATENT OFFICE
CERTIFICATE OF CORRECTION

Patent No. 3,766,061      Dated October 16, 1973

Inventor(s) Walter Mahler et al.

It is certified that error appears in the above-identified patent and that said Letters Patent are hereby corrected as shown below:

Column 16, line 47, delete "and".

Signed and Sealed this twenty-third Day of September 1975

[SEAL]

Attest:

RUTH C. MASON
*Attesting Officer*

C. MARSHALL DANN
*Commissioner of Patents and Trademarks*